Feb. 3, 1970  H. DEPLANTE  3,493,253
DEVICES FOR LOCKING TERMINAL ELEMENTS TO CONTROL RODS
Filed Nov. 1, 1967  2 Sheets-Sheet 1
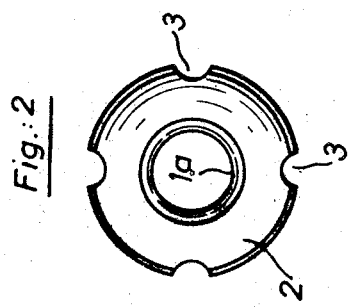
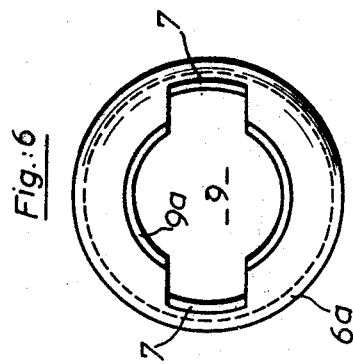
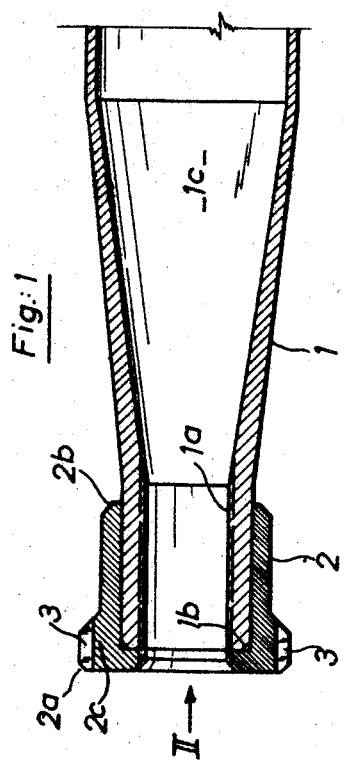
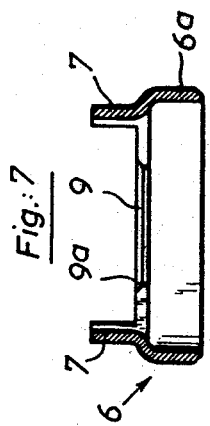

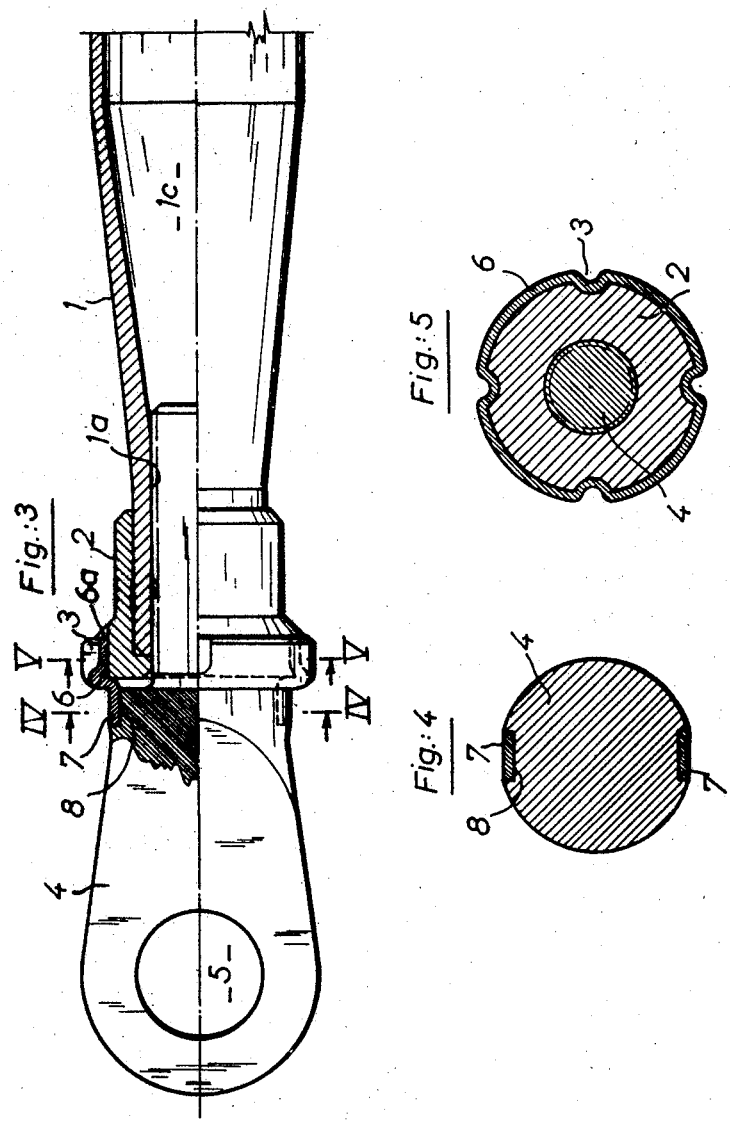

United States Patent Office 3,493,253
Patented Feb. 3, 1970

3,493,253
DEVICES FOR LOCKING TERMINAL ELEMENTS TO CONTROL RODS
Henri Deplante, Paris, France, assignor to Avions Marcel Dassault, Saint-Cloud, Hauts-de-Seine, France, a company of France
Filed Nov. 1, 1967, Ser. No. 679,729
Claims priority, application France, Nov. 10, 1966, 83,411
Int. Cl. F16b 7/00
U.S. Cl. 287—109      3 Claims

ABSTRACT OF THE DISCLOSURE

A device for locking a terminal element to a control rod, for example a terminal element screwed to a rod controlling a movable flap in an aircraft, which device comprises a locking sleeve provided with tongues, said sleeve being crimped in position on the body of the rod or on a component rigidly connected thereto, said body or said component being provided with a contoured profile with which said sleeve is crimped into engagement, with the said tongues located in seatings provided for the purpose in the terminal element.

---

The invention relates to a locking device for locking a terminal element to a control rod, in particular though not exclusively a control rod for use in aircraft to control various movable elements thereof.

As is well known, the movable elements of a modern aircraft, whether they be the control flaps which determine the course of the aircraft or its height, or the movable flaps of a variable geometry nozzle, are generally controlled by hydraulic rams. The link between the movable component of the ram and the element to be controlled may be through the medium of a cable or, preferably, through a control rod fixed to a terminal element itself articulated to the said element to be controlled. When a control rod is used, adequate security of fixing of the terminal element to the control rod has not hitherto been satisfactorily achieved, in particular in the case wherein the rod and the terminal element are made of different materials which are incompatible with one another as far as welding is concerned.

It is an object of the invention to provide a locking device to ensure maximum securing or fixing of a terminal element to a control rod, for example in an aircraft control system wherein the terminal element is usually screwed to the control rod, independently of the materials which are used to manufacture said element and said rod.

In accordance with the invention, a locking arrangement is provided which comprises, in combination with the control rod and the terminal elements, a locking device in the form of a sleeve provided with tongues, said sleeve being crimped in position on the body of the rod or a component rigidly connected thereto, said body or component being provided with contoured portions with which the sleeve is crimped into cooperation with the said tongues located in seatings provided for the purpose in the terminal element.

In accordance with a particular embodiment of this device, the contoured portions of the sleeve are in the form of grooves disposed parallel to the axis of the rod.

The ensuing description which relates to the accompanying drawing will indicate by way of example how the invention may be put into effect.

In the drawings:

FIGURE 1 is a longitudinal axial section through a control rod.

FIGURE 2 is an end view in accordance with the arrow II in FIGURE 1.

FIGURE 3 is a fragmentary longitudinal axial section, partly in elevation, of the rod of FIGURES 1 and 2, having a terminal element secured thereto and locked in position by means of a locking device in accordance with the invention.

FIGURES 4 and 5 are sections on the lines IV—IV and V—V of FIGURE 3.

FIGURES 6 and 7 are views respectively in plan and axial section, showing details of the locking device.

In FIGURES 1 and 2 is shown a control rod 1 over the terminal portion 1a of which is crimped a reinforcing ring 2. This rod 1, made for example of an aluminium alloy, is hollow. The terminal portion 1a is of cylindrical form, internally screwed and chamfered at 1b, this terminal portion being an extension of a portion 1c of truncate conical form whose wall is progressively narrowed. The reinforcing ring 2, which may also be made of aluminium alloy, is chamfered at 2a, 2b, and at one end has a thickened section 2c, in which are formed grooves 3 parallel to the axis of the rod.

FIGURES 3, 4 and 5 illustrate a terminal element 4 provided with a bore 5 by means of which it can pivot in relation to the element to be controlled (not shown), this terminal element 4 being assembled on the rod and ring assembly 1, 2 and being locked in the assembled position by a locking sleeve 6 in accordance with the invention.

The element 4, made for example of a titanium-vanadium alloy, is assembled on the assembly 1, 2 by screwing an externally threaded portion thereof into the internal threaded portion 1a of the rod 1. The locking sleeve 6, which is provided with two tongues 7, is crimped over the ring 2 so that the edge 6a of the sleeve follows the profile of said ring, i.e. engages in the grooves 3 which define the crimped contour, whilst the tongues 7 are lodged in seatings 8 provided around the periphery of the element 4.

FIGURES 6 and 7 illustrate details of the locking sleeve 6, prior to the crimping operation. This locking sleeve, which is advantageously made of malleable steel, can be manufactured very simply by a metal stamping operation. It is provided centrally with an opening 9 having a chamfered edge 9a, through which the threaded portion of the element 4 can be passed in order to be screwed into the section 1a of the rod 1.

The locking device in accordance with the invention has the advantage that it can be assembled very easily, is inexpensive to manufacture, and can be manufactured taking into account the crystalline structure of the metals or alloys of which the rod and the terminal element are made.

It will be appreciated that the above described arrangement may be modified in various ways without departing from the scope of the invention. In particular, the terminal element and the control rod can take various forms other than that illustrated, and may latch or hook together instead of being screwed together.

I claim:
1. In combination with two substantially non-deformable rigid elements (1, 4) coextensively fitted together by relative rotation to a prescribed relative angular position, a device for locking together said elements against departure from said prescribed relative angular position thereof, comprising, a one-piece locking member (6) made of deformable material and fitted to overlap adjacent parts of said elements, said locking member having a first end portion (7) which overlaps (8) one of said parts, said first end portion and said first part including means cooperating to prevent angular displacement therebetween, and a second end portion (6a) integral with said first end portion and which overlaps the other of said parts (2), said other part having generally axially extending recess means, said second end portion being internally of circular cross-section and having local portions crimped into said recess means to key said parts together in said prescribed relative angular position.

2. Device as claimed in claim 1, wherein said second end portion (6a) is in the form of a sleeve.

3. Device as claimed in claim 2, wherein said other part (2) is in the form of a ring which is outwardly of revolution shape except for said recess means which define grooves (3) formed therein, said sleeve being crimped into said grooves.

References Cited

UNITED STATES PATENTS

| | | | |
|---|---|---|---|
| 1,865,637 | 7/1932 | Lear | 151—2 |
| 2,165,323 | 7/1939 | White | 285—256 |
| 3,345,091 | 10/1967 | Nicol | 285—256 |
| 857,573 | 6/1907 | Atkins | 151—29 |
| 880,939 | 3/1908 | Virgo | 151—29 |

FOREIGN PATENTS 1,345,897  11/1963  France.

RAMON S. BRITTS, Primary Examiner

U.S. Cl. X.R.

29—517; 151—29; 285—382